Patented Aug. 7, 1923.

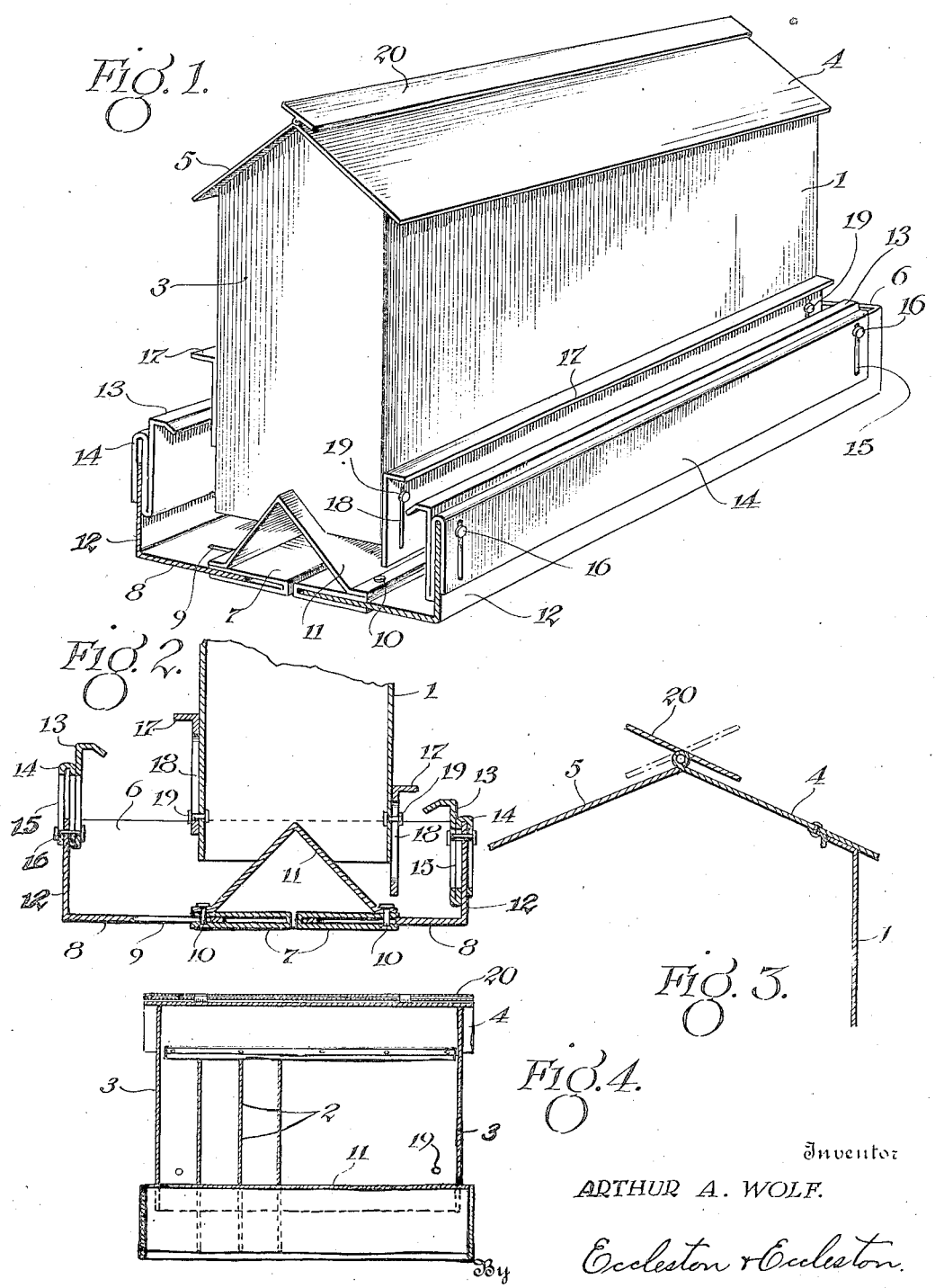

1,463,862

UNITED STATES PATENT OFFICE.

ARTHUR A. WOLF, OF PHOENIX, ARIZONA.

FEED HOPPER.

Application filed January 5, 1923. Serial No. 610,737.

*To all whom it may concern:*

Be it known that I, ARTHUR A. WOLF, a citizen of the United States, residing at Phoenix, in the county of Maricopa and State of Arizona, have invented certain new and useful Improvements in Feed Hoppers, of which the following is a full, clear, and exact description.

My invention relates to feed hoppers for poultry and the like, and has for its object to provide means whereby not only the flow of feed to the troughs may be easily regulated, but also whereby the size of the feeding opening in the trough may be varied. To this end the front and bottom walls of the trough are provided with sliding adjustments which adapt the feeding opening to various sizes of chickens from baby chicks to full grown hens. It is thus obvious that the trough may be adjusted so as to feed baby chicks, but prevent them from getting into the trough and contaminating the feed. As the chickens grow the trough will, of course, be enlarged to accommodate the larger chickens.

Other objects and advantages of the invention will be apparent from the following description when taken in connection with the accompanying drawings, in which:

Figure 1 is a perspective view of my feed hopper and troughs with the end wall removed to better display the adjustments.

Figure 2 is a fragmentary section through the hopper and troughs.

Figure 3 is a fragmentary section through the upper portion of the hopper and anti-roosting device, and Figure 4 is a longitudinal section through the device on a reduced scale.

Referring to the drawing more in detail, the numeral 1 indicates a feed hopper provided with the usual transverse partitions 2. The upper ends of the end walls 3 of the hopper are gabled and have mounted thereon the closures 4 and 5 which are hinged at the apex of the hopper.

The hopper 1 is open at its lower end, which is received in a tray designated generally by the numeral 6. The bottom of this tray is formed of two substantially U-shaped sections 7, which slidably receive the main bottom sections 8. The bottom sections 8 are slotted, as indicated at 9, and receive the rivets 10 by which the V-shaped partition 11 is secured to the U-shaped members 7. By this construction it is obvious that the bottom members 8 may slide either inwardly or outwardly, the rivets 10 acting as a stop to limit the movement in either direction.

The front walls of the tray are each formed of two collapsible sections 12 and 13. The sections 12 are secured to the bottom members 8, while the sections 13 are formed with doubled-over portions 14 which telescopically receive the walls 12. For the purpose of guiding and limiting the movement of the sections 13 with respect to the sections 12, the former are slotted, as indicated at 15, and receive the bolts 16, which also pass through the sections 12. It is apparent, therefore, that the front walls of the troughs into which the tray is divided by the partition 11 may be raised or lowered to the height desired.

Slidably mounted on the two longitudinal walls of the hopper 1 and adjacent the bottom thereof are the gates 17, which are slotted, as indicated by numeral 18, for the purpose of receiving the bolts 19 by which they may be secured in adjusted position.

A plate 20 is pivoted on the hinge of the doors 4 and 5 in order that poultry may be prevented from roosting on top of the hopper; the plate tilting from side to side as the fowls light thereon.

In operation, if it is desired to use one or both of the troughs for baby chicks, the section 13 is lowered and the member 8 slid inwardly to its limit, as indicated at the right of Figure 2. By this adjustment the smallest chicks may be permitted to feed from the trough, but the trough opening will be so small as to prevent the chicks from entering the trough and contaminating the feed. As the chicks grow larger the trough may be enlarged from time to time as may be necessary.

From the foregoing description when taken in connection with the accompanying drawing it will be seen that I have provided an extremely simple arrangement of feed hopper and troughs which may be quickly and easily adjusted to accomplish the results desired.

In accordance with the patent statutes, I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. In a device of the class described, a hopper having an opening in its bottom, a feed trough communicating with said hopper, said feed trough including a horizontal bottom wall and a vertical front wall, each of said walls being adjustable to vary the size of the trough.

2. In a device of the class described, a hopper, a tray in communication with said hopper, a longitudinal partition in the tray dividing the same into a plurality of feed troughs, the bottom of said tray being extensible to vary the size of the feed troughs.

3. In a device of the class described, a hopper, a tray in communication with said hopper, a longitudinal partition in the tray dividing the same into a plurality of feed troughs, the front walls of the troughs being formed of collapsible sections whereby the troughs may be adjusted for various sizes of poultry.

4. In a device of the class described, a hopper, a tray in communication with said hopper, a longitudinal partition in the tray dividing the same into a plurality of troughs, the bottom and front walls of each trough being extensible.

5. In a device of the class described, a hopper, a tray in communication with said hopper, a longitudinal partition in the tray dividing the same into a plurality of troughs, adjustable means for varying the size of each trough, and an adjustable plate for regulating the flow of feed to each trough.

ARTHUR A. WOLF.